Patented Sept. 7, 1954

2,688,532

UNITED STATES PATENT OFFICE 2,688,532

METHOD OF DETERMINING CARBON CONTENT OF ORGANIC FINISHING MATERIAL

Harris R. Till, Jr., Western Springs, Ill., assignor to Western Electric Company, Incorporated, New York, N. Y., a corporation of New York No Drawing. Application November 2, 1951, Serial No. 254,662

2 Claims. (Cl. 23—230)

This invention relates to methods of determining pigment content of organic finishing materials.

In paints, enamels and other similar materials having carbon pigmentation therein, the hiding power is proportional to the amount of free carbon per unit volume thereof, and it is desirable to determine the percent of carbon to ascertain whether a particular paint has sufficient hiding power for the purpose for which it is intended. However, in the past, there has been no satisfactory method of determining the percent of free carbon relative to the other pigments and the vehicle of the material.

An object of the invention is to provide new and improved methods for determining the pigment content of organic finishing materials.

A further object of the invention is to provide simple, effective and rapid methods of determining proportions of carbon in paints.

In one method illustrating certain features of the invention, a sample of an organic finishing material containing free carbon, non-oxidizable pigments and organic vehicles is heated to a temperature sufficiently high to volatilize all organic components of the vehicle and not sufficiently high to oxidize free carbon or degrade the organic matter to free carbon. The residue then may be weighed and heated in an oxidizing atmosphere to a temperature at which all the carbon therein is oxidized, leaving only the non-oxidizable pigments. The non-oxidizable pigments then are weighed, and the loss of weight is due to carbon.

A complete understanding of the invention may be obtained from the following detailed description of a method forming a specific embodiment thereof in which a sample of an organic finishing material in which the percent of carbon pigment is to be determined is placed in a platinum boat of known weight, and the boat and its contents are weighed. The material may contain, in addition to free carbon, other pigments such as chromates, titanium dioxide, silica dioxide, lead oxides, other suitable heavy metal oxides or other suitable pigments which are non-oxidizable under conditions in which carbon is oxidizable. The boat then is heated, preferably in an atmosphere of nitrogen or other non-oxidizing gas to a temperature of around 500° C., which temperature is sufficiently high to volatilize liquid materials and degrade and volatilize all other organic materials in the sample, and is not high enough to oxidize the free carbon pigment. After the boat and its contents have been heated at this temperature for a period of time sufficient that there is no further loss in weight on continued heating, the boat and the residue of carbon pigment and inorganic pigments are weighed. The percent of all pigments may be determined from these weights. The boat and the residue therein then are placed in a furnace in which oxygen contacts the boat and its contents, and are heated to a temperature sufficiently high to oxidize the free carbon, and the resulting carbon oxides are volatile and leave the residue in the boat. This heating process and weighing operations on the boat and its contents are continued alternately until no further loss of weight occurs, which indicates that all oxidizable material, the carbon, is removed from the residue in the boat. The boat and the residue are weighed, this weight of the boat and its contents then is subtracted from the previous weight of the boat before oxidation of the carbon, and the loss of weight is due to carbon so that the percent of carbon in the paint may be calculated.

If an organic finishing material having only free carbon or only a non-oxidizable pigmenting material as its pigment, the oxidizing step may be omitted.

The above-described method may be conducted quickly with inexpensive apparatus, and does not require highly skilled technicians and elaborate apparatus.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A method of determining the carbon content of organic finishing materials, including organic matter, carbon and non-oxidizable pigments, which comprises heating a sample of such a material of known weight in an inert atmosphere for such a period of time and at such a temperature that all of the organic matter in the sample is volatilized, weighing the residue, heating the residue in the presence of oxygen for such a period of time and at such a temperature that the carbon is oxidized and vaporized, and weighing the residue.

2. The method of determining the free carbon content of organic finishing materials including an organic vehicle, free carbon and non-oxidizable inorganic pigments, which comprises heating a sample of such a paint of known weight to a temperature of about 500° C. in an atmosphere of nitrogen, whereby the organic vehicle is volatilized and the carbon in the residue is not oxidized, weighing the residue, firing the residue in the presence of oxygen to oxidize the carbon and volatilize it, and weighing the residue of inorganic pigment.

References Cited in the file of this patent

UNITED STATES PATENTS

| Number | Name | Date |
|---|---|---|
| 1,743,035 | Halvorson | Jan. 7, 1930 |
| 2,224,044 | Francis et al. | Dec. 3, 1940 |

OTHER REFERENCES

Scott: Standard Methods of Analysis, 4th ed., vol. II, D. Van Nostrand Co., Inc., New York, pages 1199 and 1200.

Methods of Analysis AOAC, 6th ed., Association of Official Agriculture Chemists, Washington, D. C., 1945, pages 203, 367 and 595.